United States Patent
Fluhler

(10) Patent No.: US 10,459,070 B2
(45) Date of Patent: Oct. 29, 2019

(54) COHERENT INTEGRATION OF FILL PULSES IN PULSE DOPPLER TYPE SENSORS

(71) Applicant: Herbert U Fluhler, Huntsville, AL (US)

(72) Inventor: Herbert U Fluhler, Huntsville, AL (US)

(*) Notice: Subject to any disclaimer, the term of this patent is extended or adjusted under 35 U.S.C. 154(b) by 264 days.

(21) Appl. No.: 15/263,112

(22) Filed: Sep. 12, 2016

(65) Prior Publication Data

US 2017/0074973 A1    Mar. 16, 2017

Related U.S. Application Data

(60) Provisional application No. 62/216,944, filed on Sep. 10, 2015.

(51) Int. Cl.
| | | |
|---|---|---|
| *G01S 13/56* | (2006.01) | |
| *G01S 7/288* | (2006.01) | |
| *G01S 13/22* | (2006.01) | |
| *G01S 13/526* | (2006.01) | |
| *G01S 13/58* | (2006.01) | |

(52) U.S. Cl.
CPC .............. *G01S 7/288* (2013.01); *G01S 13/22* (2013.01); *G01S 13/526* (2013.01); *G01S 13/582* (2013.01); *G01S 2007/2886* (2013.01)

(58) Field of Classification Search
CPC ... G01S 13/56; G01S 2007/2886; G01S 7/288
USPC .......................................................... 342/28
See application file for complete search history.

(56) References Cited

U.S. PATENT DOCUMENTS

2015/0214388 A1*  7/2015  McGlone .............. G01S 7/4816
                                                            250/206

\* cited by examiner

*Primary Examiner* — Timothy A Brainard
(74) *Attorney, Agent, or Firm* — Patent Grove, LLC; Tomas Friend

(57) ABSTRACT

A method for the coherent integration of Fill Pulses in Pulse Doppler Radar sensors is disclosed. The present invention uses a pre- and a post-coherent waveform transmission and reception period to collect transient signals from reflections of Fill Pulses throughout the range extent. It then reassembles these signals to produce additional coherently integrable pulses of interval returns that are input to the filter and coherently integrated along with normally coherently integrated pulses. The result is an improved Signal To Noise Ratio (SNR) and Signal To Clutter Ratio (SCR) which is related to the total number of pulses emitted, including the Fill Pulses. This improvement can be obtained almost solely by signal processing in a digitally controlled Radar, and requires few if any hardware modifications.

9 Claims, 6 Drawing Sheets

COHERENT INTEGRATION OF FILL PULSES IN PULSE DOPPLER TYPE SENSORS

FIELD OF THE INVENTION

This invention relates primarily to Pulse Doppler type Radar, Ladar, Sonar, Ultrasound or any other sensor which emits pulses of energy for coherent detection of moving objects, and in which a small object signature and a large clutter interference tend to obscure the desired object signals, so that enhancements to Signal To Noise Ratio (SNR) and Signal To Clutter Ratio (SCR) are advantageous for the detection. A similar technique can be applied in the frequency domain and with frequency swept radars instead of pulsed radars to effect similar benefits of the invention. Additionally, other more sophisticated waveforms (for example Staggered pulse waveforms) can also enjoy the benefits of the invention through suitable modifications of the basic approach by one skilled in the art of radar systems engineering and design.

BACKGROUND OF THE INVENTION

Pulse Doppler Radar type sensors transmit a series of time coherent pulses of energy into a directional beam for the detection of moving objects in the presence of background reflections called clutter interference. Pulse Doppler Radar type sensors are widely used for many purposes such as the military detection of space, sea, air and ground targets; civil air traffic control; meteorology; metrology; medical diagnosis and imaging; and perimeter security motion sensors. In many of these uses, the signal may be obscured by sensor noise and/or clutter interference noise. In real environments, the sensor noise is often the smaller contributor and arises from the thermal noise present in all sensor systems. The clutter interference noise arises from undesired reflections of the transmitted energy from non-target scatterers residing somewhere within the interrogation beam. These non-target scatterers can be discrete (such as the face of a building) or distributed (such as reflections from the droplets in a cloud), and in reality are usually a combination of both (ground terrain for example).

When the desired object's reflected signal is small and/or the clutter interference noise is large, Pulse Doppler Waveforms (PDW) are often used to increase the Signal To Noise Ratio (SNR) and simultaneously increase the Signal To Clutter Ratio (SCR) (i.e. reduce the clutter interference noise). The PDW consists of a series of phase coherent pulses which are generally transmitted on short equal time intervals into a stationary or pseudo-stationary narrow beam. The time period between pulses need not be equal (although this greatly simplifies the implementation) but the timing must be known precisely.

The pulses are coherently integrated in a linear time-invariant filter, usually implemented as a Bank of Doppler Filters (BDF), specifically designed to both increase the SNR and to suppress the Clutter interference noise. The SNR is increased in a BDF because the coherently integrated signal energy increases as $N^2$ (the number of received and coherently integrated pulses), whereas the thermal noise energy only increases nominally as N leading to a Signal to Noise power ratio increase of N. The clutter interference noise is significantly reduced because the clutter return is coherently cancelled in each Doppler Filter. Some residual clutter interference noise is always still present in the band pass of the Doppler Filters because of imperfect coherence, often dominated by the system's Phase Noise and associated frequency spectrum. However, since there are usually about as many Doppler Filters in the BDF as there are pulses, the total residual clutter interference noise is divided among the Doppler Filters, thereby somewhat further reducing the clutter interference noise. More specifically, the residual clutter interference noise can be derived from the frequency spectrum of the Phase Noise and the spectrum of the clutter interference noise within the band pass of each Doppler Filter.

Linear time-invariant filters such as the Doppler Filter generally require initialization at start-up in order to avoid undesirable transients which might tend to obscure the desired signal. In order to prevent such transients, such filters are usually operated in a steady state mode. However, steady state operation implies that a transient start-up phase occurred at a significant time prior to the start of the desired coherent integration period containing the pulses to be filtered. In non-continuously pulsed radars this start-up phase is implemented by preceding the desired coherently integrated pulse sequence with a set of "Fill Pulses" of a like pulse width, pulse shape, pulse spectrum and nominally inter-pulse interval as the pulses to be coherently integrated. The presence of the Fill Pulses initializes the filter by filling the entire range extent presented to the radar with coherent pulse energy. By filling the entire range extent with pulses, this allows time for the filter to achieve a steady state before the pulses to be coherently integrated are applied to the filter. As a result, the coherently integrated pulses will be filtered without significant debilitating transients. Note that the transients of concern here are those induced by reflections of the first few pulses from scatterers in the first ambiguous range intervals. Reflections from further out range intervals are usually not of consequence, since clutter rolls off with range due to the earth limb horizon (usually about 40 km for a ground based radar on flat terrain or ocean surface).

The problem with the aforementioned Fill Pulses is that they consume Radar energy and radiation ON-time, but do not contribute to the coherent integration or thence the sensitivity of the Radar (other than indirectly through the suppression of the aforementioned transients). Furthermore, the transmission of Fill Pulses can consume a significant fraction of the PDW Dwell Time, thereby robbing beam time from the surveillance raster of the Radar as well. Since each beam Dwell position requires a finite time period, longer Dwells Times incurred by the addition of Fill Pulses can increase the time needed to search a required solid angle volume. Additionally, track revisit rates are reduced by requiring fill pulses which degrades tracking accuracy and robustness. Finally, the need for Fill Pulses increases the prime power requirement of the radar and also forces the radar to emit more energy which can help attract Anti-Radiation Missiles (a significant survivability threat to military Radars). As a result of all these factors, there is a clear desire to either eliminate Fill Pulses altogether if possible, or at least to use their energy to contribute to the sensor's performance. The present invention focuses on recovering the Fill Pulses to contribute to the sensor's performance. It can likewise be used to reduce the prime power requirement and the emitted RF energy while retaining the same detection sensitivity.

DESCRIPTION OF THE DRAWINGS

FIG. 6 illustrates how the IQ clutter signal vector is constant over all the IPPs in the IQ domain.

FIG. 7 illustrates how a moving target's Doppler measurement vector rotates in the IQ domain, completing an integral number or rotations across the CPI for each Doppler Filter employed.

DESCRIPTION OF THE INVENTION

This invention deals primarily with pulsed type Doppler radars, but the teachings herein can be applied to either time or frequency domains where RF energy is needed to enable the operation of the radar in the presence of clutter. If there is no clutter or if a radar does not need to suppress any clutter, then all pulses transmitted can all be coherently integrated to provide a maximum Signal to Noise Ratio (SNR) or Signal To Clutter Ratio (SCR) improvement, and the teachings of this invention are not necessary nor germane.

Very long range radars such as those used to track Ballistic Missiles often do not encounter clutter in their operating regime. But very few short range practical radars systems do not experience at least some type of clutter environment that challenges their capability. When clutter is encountered, it can have a devastating impact on sensitivity and performance of Doppler systems. Therefore, radars that operate in clutter environments must adopt means to deal with and nominally suppress the clutter least the clutter prevent their operation, or at least seriously impair it.

Although there are a number of schemes that can and have been devised to deal with clutter, the most robust and prevalent is the use of Pulsed Doppler (PD) Waveforms (PDW) and its associated Pulsed Doppler Filter Bank processing. In this work we will refer to this as "traditional" PD or clutter processing and it represents the Prior Art against which this invention improves upon. The central goal of this invention then is to improve the PDW performance when in the presence of stressing clutter environments.

Figure 1:
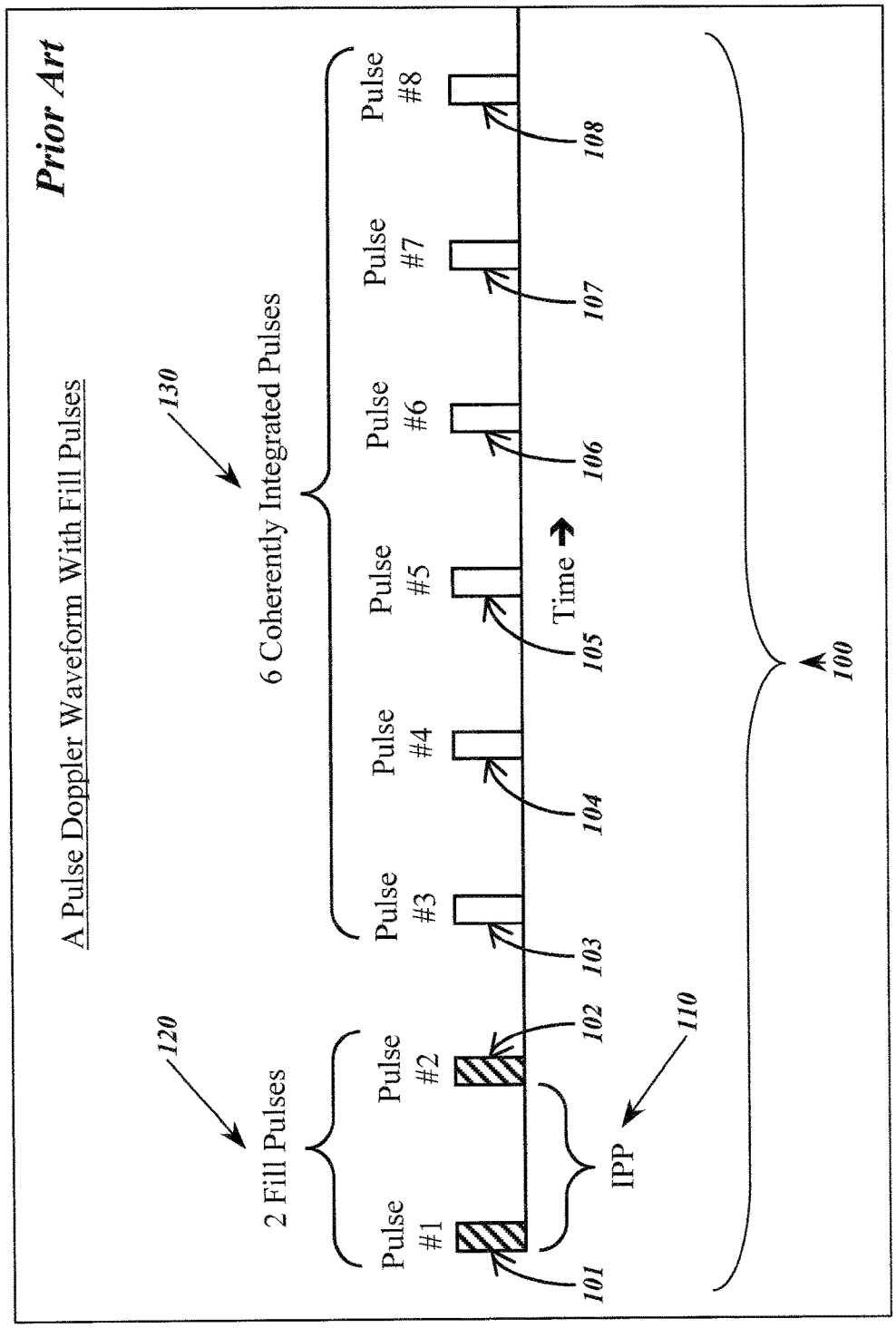
FIG. 1 illustrates a traditional Pulse Doppler Waveform (PDW) with both Fill Pulses and Coherently Integrated Pulses within the Coherent Processing Interval (CPI) in accordance with the Prior Art. The PDW is assumed to comprise a plurality of identical pulses, such pulses being time and phase coherent and being separated in time precisely and equally by an Inter-Pulse Period (IPP), the pulse widths of all the pulses being precisely all the same and nominally of a duration less than about 10% of the IPP.

FIG. 1 shows a traditional Doppler Filter (PD) Waveform (PDW) according the current Prior Art comprising a number of Fill Pulses and a subsequent number of coherently integrated pulses collected and processed with a period referred to as the Coherent Processing Interval (CPI). The fill pulses are used to "fill" up the range bins that have clutter reflection scatterers in them, and these Fill Pulses are not processed for detection by the traditional PDW processing. These Fill Pulses therefore represent a waste of radar RF power from a pure economics standpoint, although they are absolutely necessary to achieve good Doppler target detection performance in the presence of clutter.

Figure 2:
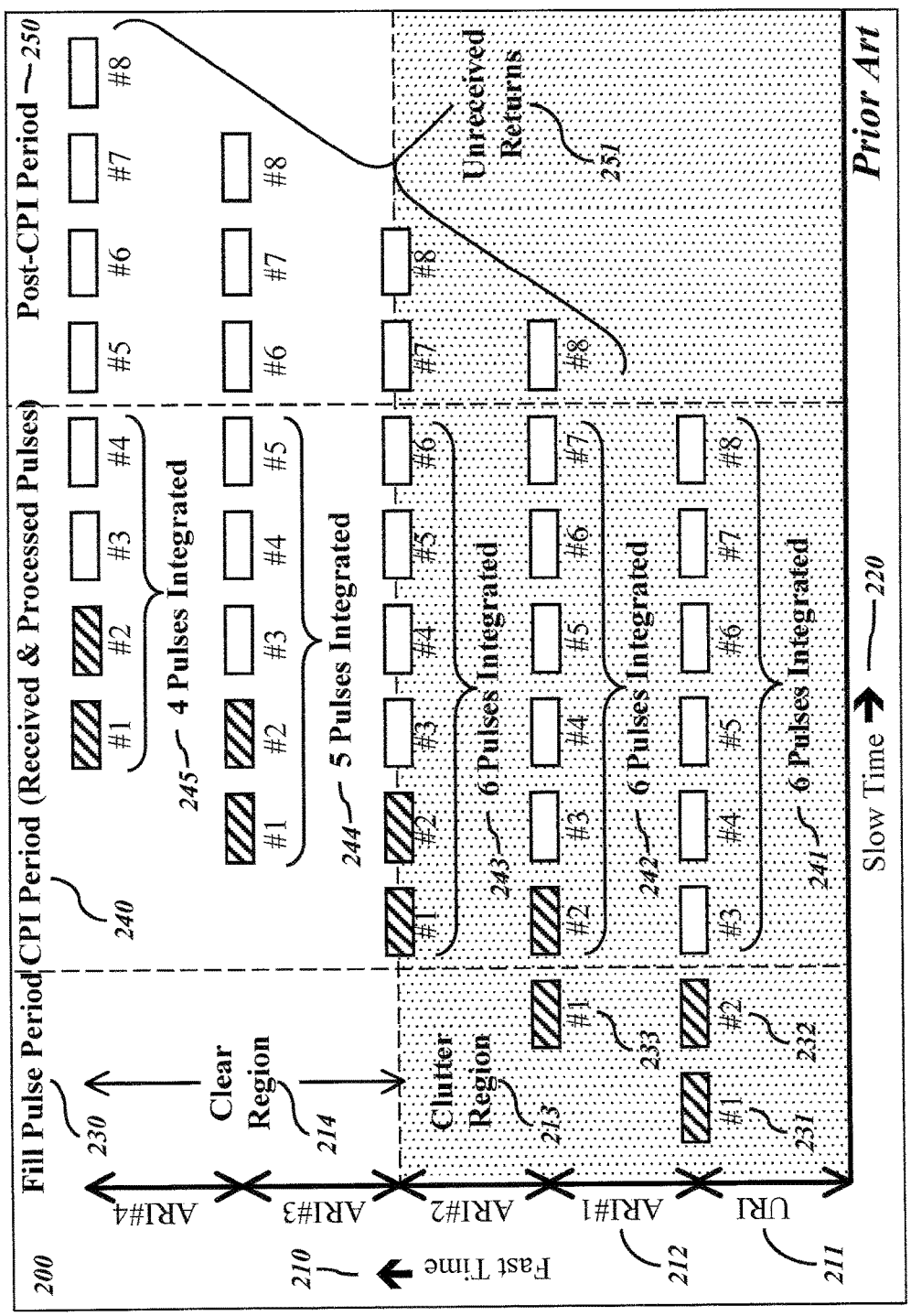
FIG. 2 illustrates a Fast Time vs Slow Time plot of a traditional PDW in accordance with the Prior Art, its relation to both the clutter in the Clutter region along the Fast Time axis as well as the complementary Clear Region, as well as showing how the pulses of the PDW propagate into and from range ambiguous range intervals as a function of Slow Time and Inter-Pulse Period (IPP), with enumeration and identification of the pulses. For the purposes of describing the invention the pulse widths and amplitudes are all assumed to be the same

FIG. 2 shows a Fast Time (Range) vs Slow Time (Dwell Time) Map 200 of the pulse history from the 6 pulse coherently integrated Pulsed Doppler radar waveform (8 pulses total) of FIG. 1. The Fast Time is the vertical axis 210 and the Slow Time is the horizontal axis 220.

The Fast Time axis 210 may be subdivided into a (typically) closer range Clutter Region 213, and a (typically) farther range Clear Region 214. The Clutter Region 213 is characterized as containing stationary or pseudo-stationary reflectors (typically the ground, trees and water waves when over open water bodies) which interfere with the detection of moving and particularly slow moving targets of interest. It is the core objective of Pulse Doppler waveforms and their associated processing to reduce, cancel or remove these Clutter Region reflections from the collected dwell signals. The Clear Region 214 is characterized as not containing significant stationary reflectors and therefore has a low impact on the sensitivity of targets in this region. The Clear Region typically starts at the terrain horizon or at the earth limb, which ever is farther, and extends to the Instrumented Range of the radar.

The Fast Time axis 210 can be further broken down into Range Intervals (RI), each corresponding to the furthest distance from a reflected pulse traveling the round trip distance to said furthest distance in the time between pulse transmissions, nominally the Inter-Pulse Period (IPP). The first such RI is called the Unambiguous Range Interval (URI) 211 equal in range to c*IPP/2 where "c" is the speed of light in the medium (nominally air). The URI 211 is characterized as starting at zero range and not having any range ambiguity because it is the closest RI. The next RI 212 is the first Ambiguous Range Interval (ARI#1) characterized as starting at the end of the URI 211, and extending for a total of 1 RI further from the end of the URI 211. A range measured within the ARI#1 212 is ambiguous with a range measured from URI 211 (hence its nomenclature of being "ambiguous"). That is, a pulse that is received during an IPP from the ARI#1 212, cannot be distinguished from a like pulse transmitted more recently if the more recent pulse is received at the same time as the prior transmitted pulse returning from a range in ARI#1 212. Since both more recent and less recent pulses in the pulse train of the Pulse Doppler waveform are temporally identical, there is no way to tell them apart except for maybe the signal strength appearing different due to the real and actual range difference when reflected from targets in different RIs. However, since one usually does not know a priori the Radar Cross Section (RCS) of the target, the signal strength cannot be used as a reliable indicator of the RI of the reflecting target (although in a more advanced radar scheme it might could be used in a Bayesian approach).

The Pulse Doppler Waveform (PDW) and associated Dwell begin with the transmission and reception of a first pulse labeled by "#1" and shown in FIG. 2 as being received at the end of the first IPP corresponding to the maximum range that may be registered in URI 211 at range 231. Immediately after the reception of the first pulse, a second pulse labeled as "#2" is transmitted. Note that while the second pulse "#2" is transiting URI 211, the first pulse "#1" is still traveling and transiting ARI#1 212, eventually arriving at and returning from the maximum range extent 233 of the second RI, ARI#1 212, one IPP later.

Also at a time IPP later, the second pulse "#2" of the PDW is received and registered similarly to the first pulse "#1" as returning from a farthest extent of the first RI URI 211, but one IPP later in time at 232 also corresponding to the maximum range that may be registered in URI 211. The timing is then such that the reception of a reflection of the first pulse "#1" from a target at the furthest extent of ARI#1 212, coincides with the reception of a reflection of the second pulse "#2" from a target at the furthest extent of the URI 211. Therefore, the range of the target in the ARI#1 is ambiguous with the range of a target in the URI separated by one RI.

It is noted that the Clutter Region 213 extends across the URI 211 and two ARIs 212, ARI#1 and ARI#2. Recalling the need for a time invariant filter to be initialized for maximum suppression of transient responses, the first two pulses of this PWM are assigned to be "Fill Pulses" the purpose of which is to fill with synchronous pulse energy, the two RIs that contain clutter beyond the URI in the Clutter Region 213, to whit ARI#1 and ARI#2 of the ambiguous range intervals 212. Because these first two pulses do not have any reflections returning from ARIs 212 ARI#1 or ARI#2 from any prior pulses, they necessarily are transient in nature and are completely ignored in traditional PDW processing. Hence in traditional PDW processing the coherent integration of pulses does not begin until after the Fill Pulses in the Fill Pulse Period 230 have been transmitted.

In FIG. 2, coherent processing does not begin until the third pulse labeled "#3" is transmitted as shown within the Coherent Processing Interval (CPI) Period 240. All the pulses transmitted during the CPI Period 240 have reflections from the clutter in the Clutter Region 213 from prior Fill Pulses #1 (231, 233) and #2 (232), and/or subsequent pulses. Therefore there will be no transients induced by differentiated reflections from the Clutter Region 213, and PDW processing will provide most sensitive and optimum results for the pulses that are coherently integrated within the CPI Period 240, and the different RIs 211 and 212 to whit 241, 242, 243, etc.

There are two problems with the above traditional schema of PDW processing. First, although the inclusion of Fill Pulses eliminates transient reflections from further out RIs that would permit clutter residue noise to increase and thereby lower sensitivity, this scheme employs a total of (in the example of FIG. 2) 8 pulses, but only coherently integrates 6 pulses, thereby representing an excess expenditure of transmission energy which is not fully recovered in the reception and processing for the detection of targets. Stated more simply, the energy transmitted in Fill Pulses is lost for the detection of targets, as only the pulses in the CPI are coherently integrated for the reasons cited above. It is a first objective of the present invention to solve this problem and recover all the energy transmitted for all pulses towards the detection of targets.

A second problem with the traditional schema of PDW processing is that only the RIs covered by Fill Pulses (i.e. the URI, ARI#1 and ARI#2 in the example of FIG. 2) even provide the full coherent integration of the CPI number of pulses, as seen by 241, 242 and 243 in FIG. 2. RIs in the Clear Region 214 beyond the Clutter Region 213 do not manifest any clutter reflections which could cause Doppler Filter processing transients, but have a fewer number of pulses to integrate as illustrated at RIs 244 and 245 in FIG. 2. The lost pulses 251 are delayed past the CPI Period 240 into the Post-CPI Period 250 where they are never received and sampled because they are after the CPI Period 240.

This is significantly detrimental to the detection of targets at far out ranges because there are literally fewer pulses in the CPI to integrate from RIs in the Clear Region 214. Note that this loss of CPI pulses occurs at the farther ranges, the detection of which are already significantly challenged by the stressing $1/R^4$ free path loss. It is therefore a second objective of the present invention to provide more coherently integrated pulses in the Clear Region 214 RIs.

It is also interesting to note that if Pulsed Doppler Dwells were back to back (or nearly so, often with no more than one IPP separating them) and if they are on the same frequency, then the unreceived pulses 251 from a first dwell could act as interfering signals to a second sequential dwell. This is more likely to be an issue if the first dwell employed a large number of Fill Pulses and the second dwell employed only a minimal number of Fill Pulses, or even no Fill Pulses, but depending on the number of Fill Pulses used and the extent of the Clutter Region it could be more or less of a problem. It is therefore a third objective of this invention to eliminate this possible source of interference between adjacent back to back dwells.

Figure 3:
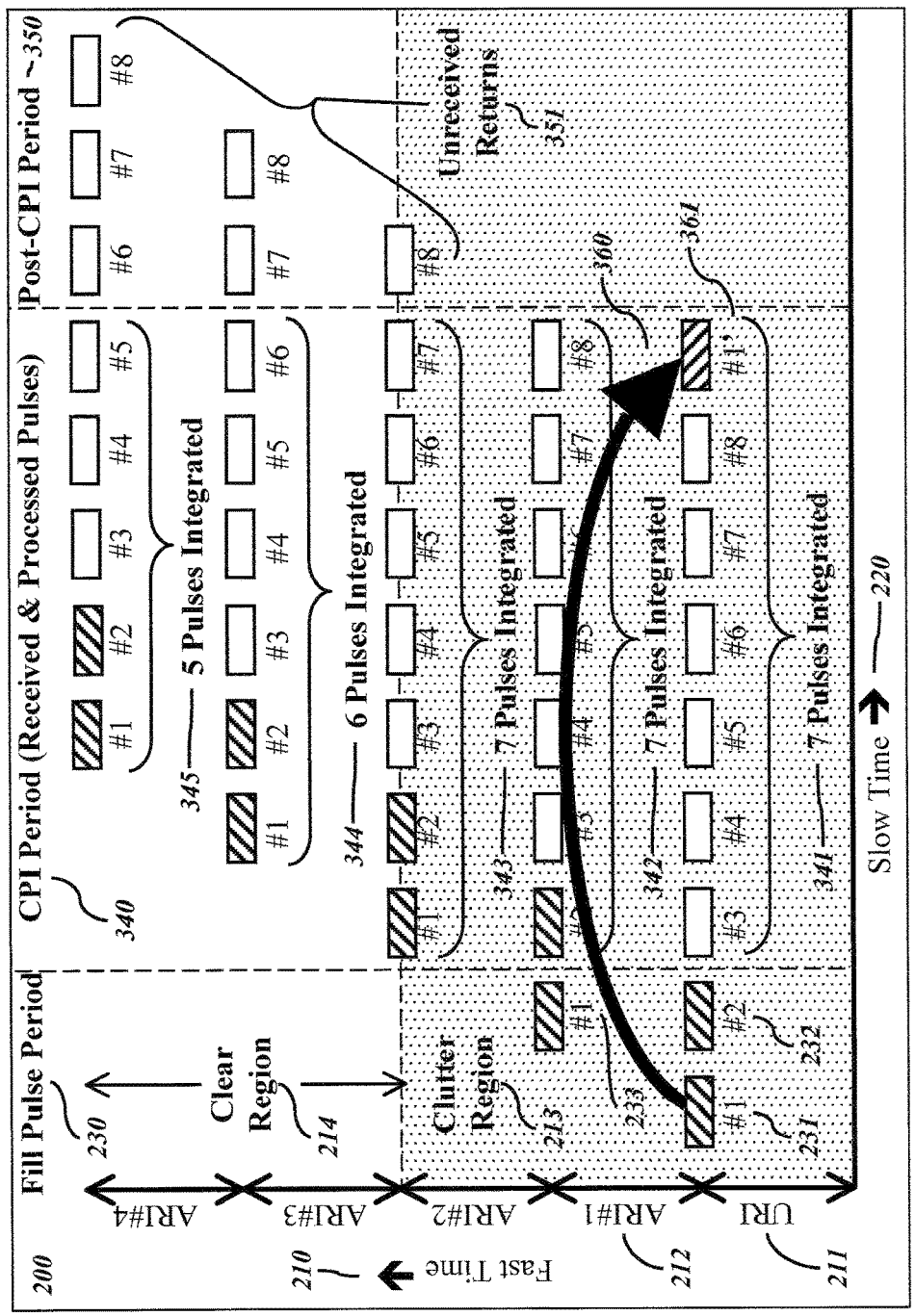
FIG. 3 illustrates a first embodiment of the invention again in a Fast Time vs Slow Time plot showing how the IQ data for the First Fill Pulse can be digitally copied and added to the IPP after the traditional CPI in order to complete the IPP through addition of the Clutter (and potentially target) signal contained in the First Fill Pulse IQ data. This completion ensures the content of the Clutter signal in this late time IPP is identical to the Clutter content of the other IPPs, and this then enables its use in Doppler Filtering by elimination of the transients and subsequent degradation of Doppler Filter performance that would be incurred were this not done.

FIG. 3 illustrates a similar pulse train as FIG. 2 and shows how the above objectives of the invention may be achieved. It is first assumed that the radar is a substantially digital sensor capable of recording In-Phase and Quadrature (IQ) data for use in the Signal Data Processor (SDP) and that the SDP has sufficient computational resources to perform the required data and processing manipulations to be described next. The pulse transmission sequence in FIG. 3 for the invention is identical to the pulse transmission sequence of a traditional PDW radar in FIG. 2, with the exception of a delay in the transmission of the next subsequent dwell as will become apparent very shortly. No additional pulses are transmitted or otherwise modified.

The core of the invention is in the modification of the reception of pulses and their subsequent post processing. The first step in the invention is to digitally record and store all the IQ data from all the pulses during each IPP in both the Fill Pulse Period 230 and the CPI Period 340. This is almost the same process as is done in a traditional PDW processing, except that usually the Fill Pulse IPP data for 231, 232, 233 is not recorded or stored. Then, as shown in FIG. 3, instead of cutting off the CPI period 340 after the transmission of Pulse #8 of 241 (plus one IPP for its reception from URI 211), the CPI Period 340 is extended for one additional (seventh) IPP to make the CPI Period 341 7 IPPs in duration instead of only 6 IPPs in 241. IQ data is collected for this 7th CPI Period IPP just like all the prior 6 CPI Period IPPs.

Upon completion of the CPI Period 340, the IQ data for the first IPP that was recorded for Fill Pulse 231, is copied and pasted (360) over the first RI's worth of Fast Time data in the IQ data recorded for the 7th IPP in the new CPI Period 340. Note that all other things being equal, since all the pulses are assumed time and phase coherent, this transference of the first Fill Pulse data 231 to the 7th IPP 361 (labeled #1') of the new CPI Period 340 is identically transparent. That is, after the copy paste, the IQ data will look absolutely identical to the data had a pulse #9 been transmitted at the end of the CPI Period 340. This copy paste then back fills a copy of what might have been pulse #9 using the first Fill Pulse 231 as a template to insert at 361. In the process of doing this, the data for the CPI 341 in the first RI, (URI) is fleshed out, enabling a full 7 pulses of coherent integration.

Similarly, the extended CPI Period 340 now enables lengthening of the number of pulses in the CPI to a full seven IPPs in farther down range intervals 342, 343, and one extra pulse in each of 344, 345. This results in a direct improvement of both Signal To Noise Ratio (SNR) and Signal to Clutter Noise Ratio (SCR) proportional to the ratio of the number of coherently added pulses with the new method divided by the number of coherently added pulses in the traditional method, providing a corresponding improvement in detection range without the need to transmit additional RF power. Note that as might be expected, the number of wasted unreceived pulses 351 in the Pose-CPI Period 350 is now also reduced.

Figure 4:
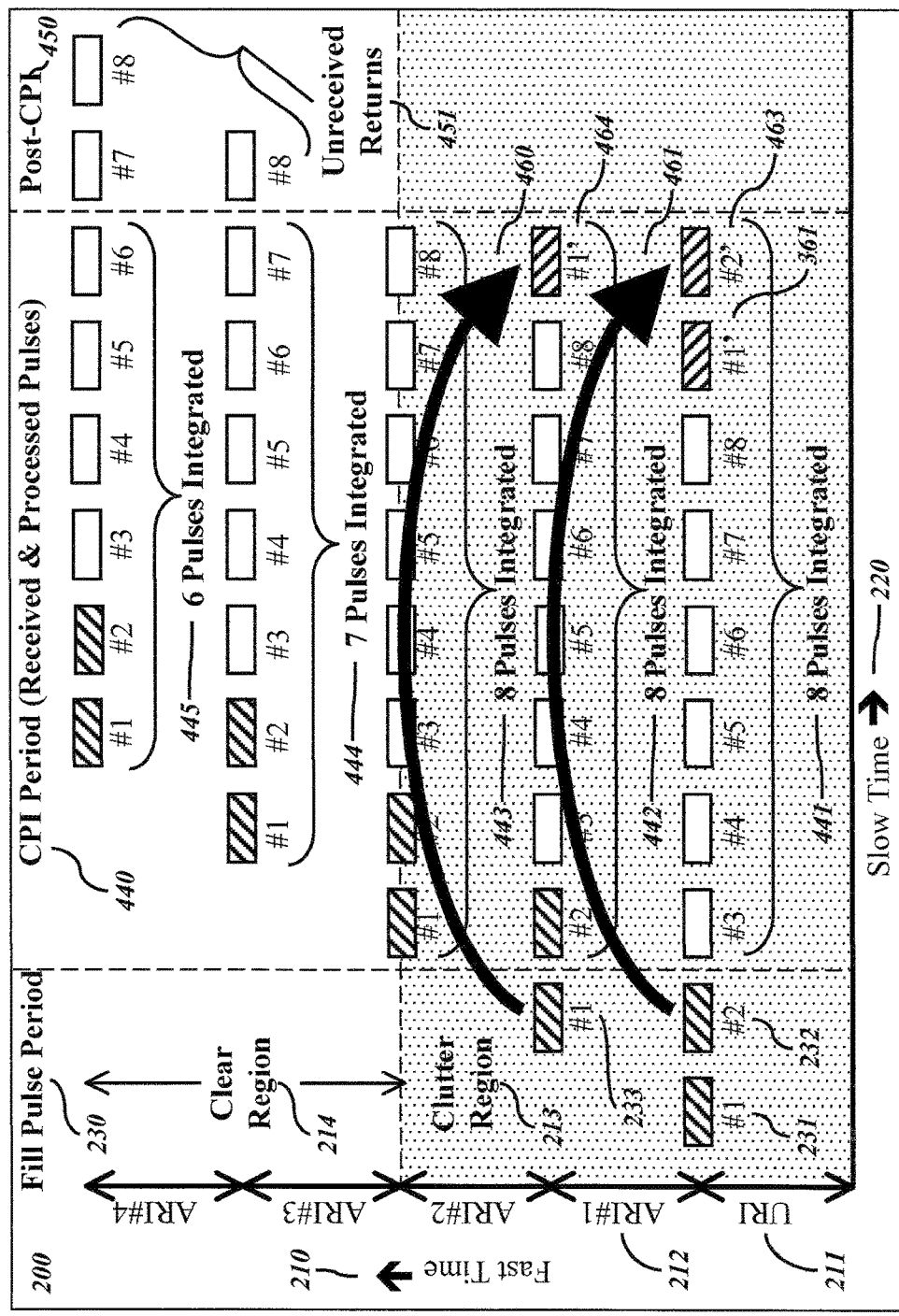
FIG. 4. is very similar to FIG. 3, except that it is illustrated how the process of clutter noise substitution can be extended to additional IPPs in sequence to the first, thus enabling the approach to be used for any number of Fill Pulses, IPPs, and total numbers of pulses.

In a completely analogous manner in which the CPI was extended by one additional pulse as described above, the CPI may be increased by the same method to a maximum of the total number of pulses transmitted, including the Fill Pulses. FIG. 4 illustrates the extension of the process shown in FIG. 3 to include all the Fill Pulses in the Fill Pulse Period 230. In a like manner as before, the IQ data from the second IPP of the Fill Pulse Period 230 is digitally recorded and stored. The CPI Period 440 is extended by two IPPs to include what might have been the 10th pulse had that many pulses been transmitted. The process of FIG. 3 is performed for the first Fill Pulse 231 as previously described. Then an essentially identical process is performed for the second Fill Pulse 232 and its two RIs to 233, copying that data and pasting it as shown by 460 and 461 over the corresponding RIs data in the 8th IPP of the CPI Period 440. This results in back filling the data for the RIs in the 8th CPI Period IPP as shown by 463 for pulse #2' and 462 for pulse #1' which has propagated to the second RI (ARI#1). Again, since the radar is assumed time and phase coherent, this copy and paste operation provides an exact duplicate of the data that would have been received and recorded had a 7th and 8th CPI pulse (9th and 10th total number of pulses in the PDW) actually been transmitted. Also, the further out range intervals 444 and 445 also have more pulses than before, thereby enhancing their SNR and SCR and hence sensitivity to targets. Again, the number of unreceived pulses 451 are further reduced from FIG. 3 because more transmitted energy is being harvested than before.

The above process is obviously extensible to any number of Fill Pulses by one skilled in the art of radar PDW processing. The invention enables full recovery of all Fill Pulse energy through coherent addition of the Fill Pulses into the PDW processing for enhanced SNR and SCR. It also increases the length of the CPI to provide better Doppler resolution and hence better velocity measurement accuracy. The invention further increases the number of coherently integrated pulses in the farther out range intervals in the Clear Region to provide higher SNR and SCR at farther ranges. The invention also decreases the number of unreceived pulses, and helps avoid dwell to dwell interference. As a side benefit It further enables detection and tracking of slower targets both because of the additional degrees of freedom afforded a PDW with more pulses and because the filter skirts can be steeper to get closer to the clutter ridge. By shortening the duration of and increasing the range of the pulses that are unreceived, the potential for Dwell to Dwell interference is significantly reduced.

Figure 5:
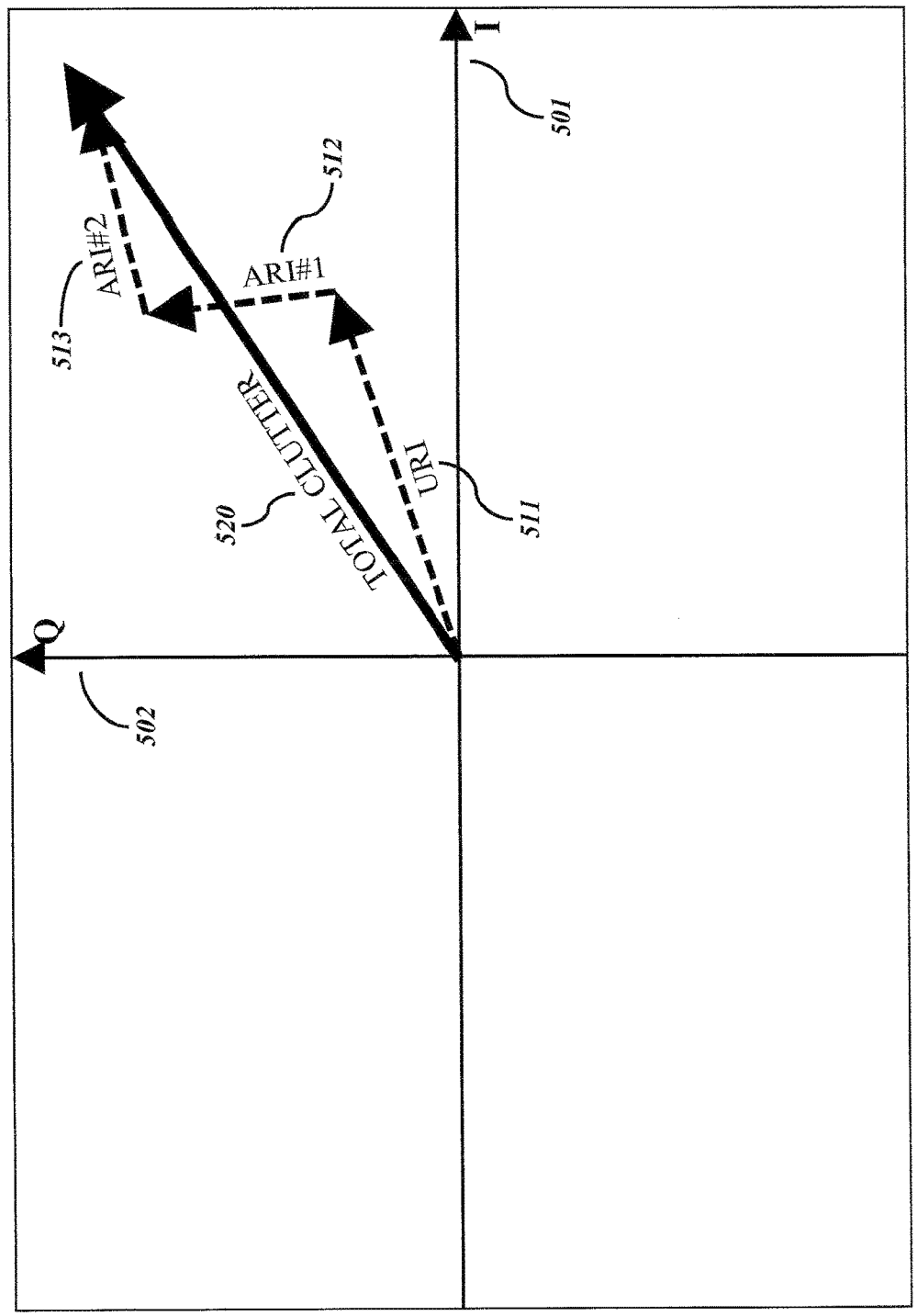
FIG. 5. shows that the IQ Clutter signal in a given range bin is actually the vector summation of the folded over clutter from other farther out range intervals, suggesting that these need to be accommodated in the invention, and also showing that this Clutter signal is essentially constant over all the IPPs and range bins.

The means for Doppler Processing the afore-described rearranged pulse data is described next. FIG. 5 shows the composition of the received Clutter Signal Vector (Clutter Vector or Clutter) from one range bin collected during an IPP 520 plotted on a graph of the In-Phase 501 and Quadrature 502 ADC voltages. The Clutter 520 is comprised of the vector sum of all the clutter reflections from the clutter scatterers in a range bin folded in from all the range intervals within the Clutter Region 213 filled by Fill Pulses. In keeping with the prior figures, this includes but is not limited to reflections from the aliased range bins in the URI 511, ARI#1 512 and ARI#2 513 range intervals. These aliased fold overs of clutter from the farther range intervals comprise the "transients" that need to be removed by the initialization of the Doppler Filter system with Fill Pulses in order to maximize Doppler Filter performance. The copy and pasting of IQ data described previously ensures that all the additional IPPs that are to be processed in the invention have these same clutter contributions in all IPPs processed. In what follows they will no longer be shown but are known to be summed within the total clutter vector 520 for each IPP. However, it is important to note that the copy paste operations described previously were done to ensure that all the IPPs from the Post-IPP Period 250 of FIG. 2 that are to be subsequently covarently integrated as shown in the new CPI Period 440 of FIG. 4, contain all the reflections from all range intervals with clutter so that they can be coherently processed as shown. This was the purpose of copying the early IPP data from the Fill Pulse Period 230 into the later IPP data 250 to create the new and improved CPI Period 440 with larger SNR and SCR.

Figures 6, 7:
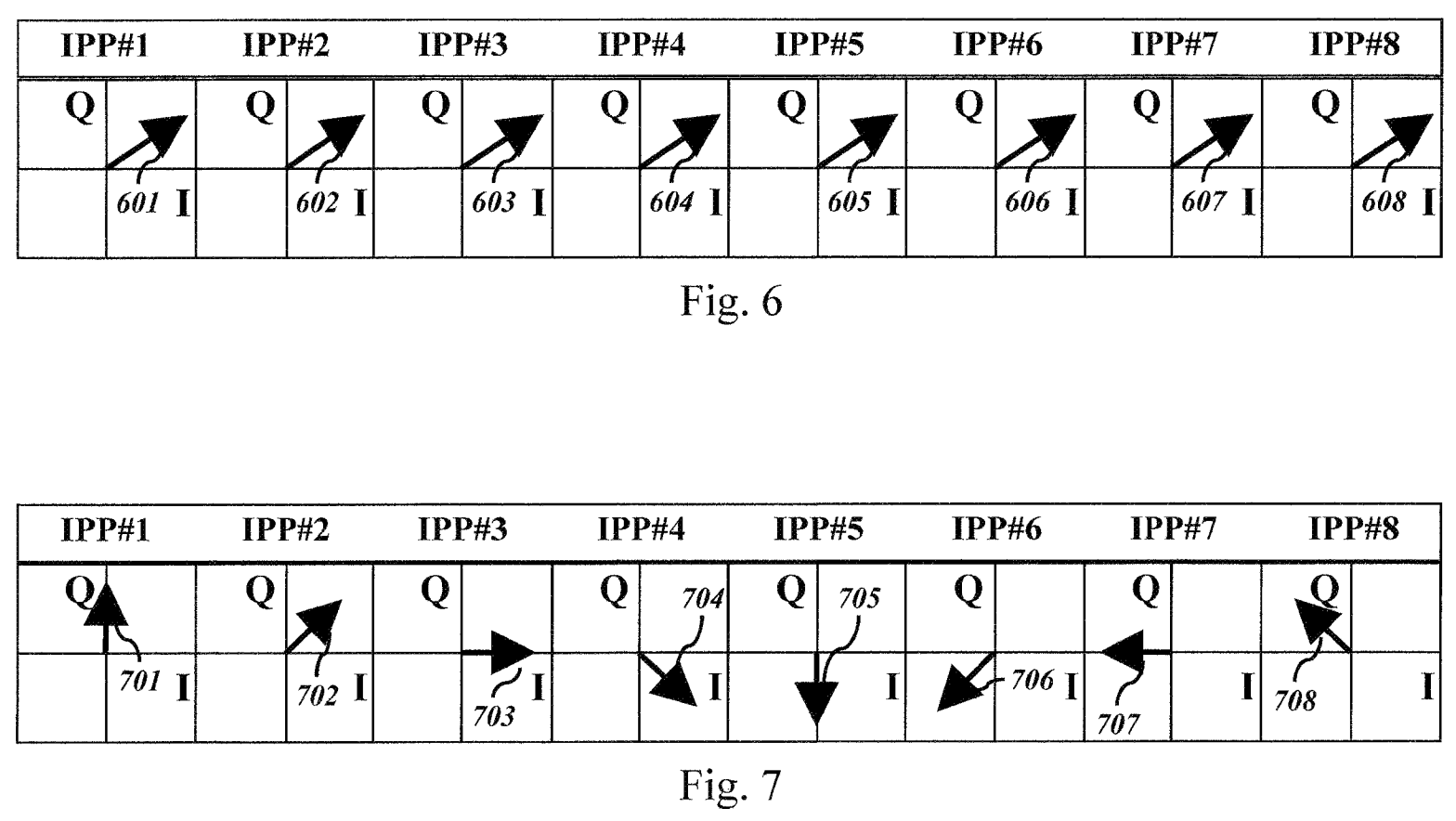

FIG. 6 shows illustrative IQ measurement vectors 601 through 608 for each of the 8 IPPs in a 8 pulse PDW of Clutter without any target. Note that the Clutter measurement is (at least theoretically) identical to 520 for each IPP measurement because the Clutter is stationary and not moving. FIG. 7 shows illustrative IQ measurement vectors 701 through 708 for each of the 8 IPPs in a 8 pulse PDW for a radially moving target without any Clutter present. Note that because the target is moving, the phase of the target signal vectors 701 through 708 rotates in equal increments about the center of the IQ axis. This is the important feature that makes it possible for Doppler filters to discriminate between clutter and moving targets.

As shown in FIGS. 6 and 7, and assuming equal IQ axis scales in both FIG. 6 and FIG. 7, the target vector signal would appear to be about as large as the Clutter vector signal in these figures. However this is not usually the case in real applications, wherein the Clutter vectors 601 through 608 are normally much larger than the target vectors 701 through 707. This is overtly germane to the invention but prudent to point out for a realistic perspective towards the application of the invention.

Therefore in most realistic situations, the clutter vectors of FIG. 6 are much larger than the target vectors of FIG. 7. Furthermore, in realistic situations of interest the clutter vectors exist in the same data and are added vectorially with the target vectors in the same IPP. This then leads to vector sums for each IPP as illustrated in FIG. 5, wherein the vector signal for each IPP is dominated by a large substantially constant clutter vector 520 the end tip of which then traces a smaller circular path at the end from IPP to IPP, said trace induced by the addition of the smaller target signal vectors comprising the Doppler signal. The objective of the Doppler Filter then is to separate the large unchanging clutter vector signal of FIG. 6 from the potentially much smaller Doppler vector signal of FIG. 7 from the target.

In order to reveal the smaller target signal from the larger clutter signal, the Doppler Filter must suppress the potentially larger Clutter Vector Signal 520 (alternatively 601 through 608 on an IPP basis). This may be accomplished by rotating the IQ data from each IPP by an angle (+/−) *k*360/N degrees where N is the total number of pulses (alternatively total number of IPPs), and k is the specific sequential IPP count number (an integer). What this does is to spread each IPP's Clutter Signal Vector in different directions evenly around the IQ unit circle. When these IPP Clutter Vectors are then added up, they will sum to zero because they are of equal magnitude and pointed evenly in different directions. Furthermore, there will be a band of Doppler frequencies which start out pointing in different directions, but that will then be co-aligned by the same above described rotations in the IQ space. So there will exist a Doppler frequency where the IPP target Doppler vectors 701 through 708 become co-aligned, while the IPP Clutter vectors become anti-aligned. The rotated IPP target Doppler vectors will then coherently add upon summation, and the rotated IPP Clutter vectors will cancel to zero upon summation. For different Doppler frequencies, different modulo 360 degree rotations are employed to ensure the Clutter vectors always vector sum to zero. This is the fundamental operation of Doppler filters and is covered in more detail in Reference [1] which is incorporated herein by reference.

With the fundamental operation of Doppler filters now reviewed, the modifications needed to implement Doppler filtering with the modified IQ data from FIG. 4 is now apparent. The copy and paste operations leading up to FIG. 4 filled in missing Clutter signal IQ data for range intervals not filled with pulses within the Post-CPI Period 250, enabling those IPPs (specifically IPP #9 and #10 within 250 for the example given), to be coherently processed to create a larger CPI Period with more (8) coherently processed dwells (IPPs) as shown in 440. After the copy paste of early Fill Pulse IQ data with the like number of late post 240 IPPs on a one for one basis, then all the IQ data from each of the IPPs in the CPI Period of 440 have the same identical Clutter signal data, which therefore with the appropriate Doppler Filter processing as described above and in reference [1] will cancel to zero when output from the Doppler Filters.

Note now that if a target is also present in any of the range intervals within the CPI Region, and if the frequency of the target is not within the passband of a given Doppler Filter within the Doppler Filter Bank, then those target Doppler vectors will be rotated to semi-random directions by the filter and the vector sum will be some small residue which has a theoretical limit of zero for an infinite number of pulses. However, if the target Doppler frequency matches the frequency of the Doppler filter in the Doppler Filter Bank, then that means that the target Doppler frequency must be cyclical within the CPI Period. That is, the target Doppler frequency will complete an integral number of cycles within the CPI Period 240 for the case of 6 coherently processed pulses, or 440 in the case of 8 coherently processed pulses using the teachings of the invention.

Obviously then the employment of the invention requires the use of a Doppler Filter with more pulses (coefficients) than without the invention. In the examples above, the normal processing before the invention of FIG. 2 would require a Doppler filter for 6 pulses (coefficients) to process the 6 pulses within the CPI Period 240. However, the new invention will employ a Doppler Filter for a number of pulses equal to the total number of pulses transmitted, including Fill Pulses, or in the example above a total of 8 pulses as shown in the CPI Period 440 of FIG. 4.

There is however one additional change needed to the Doppler filtering. Since the target Doppler signal is cyclic across the CPI Period for the correctly matched Doppler Filter, the Doppler Filter must be modified to have a cyclic sequence of processing instead of a linear sequence of processing. By way of example, when the IQ data of the first IPP, corresponding to the first Fill Pulse #1 (231) in FIG. 3 is added to the IQ data from the last IPP in the extended CPI Period 340 corresponding to Pulse #1' (361), this action requires a like resequencing of the Doppler Filter coefficients, specifically, moving the first Doppler Filter coefficient to the end of the sequence so it will be applied to the data of the last IPP #1' (361).

Mathematically, the Doppler Filter for the traditional processing of FIG. 2 is:

$$DF_i = \left[ \sum_{k=3}^{8} w_{i,k} \cdot x_k \right]$$

Where $DF_i$ is the output for the ith Doppler Filter, $w_{i,k}$ is the filter coefficient for the ith Doppler filter and kth IPP, and $x_k$ is the complex scalar IQ measurement for a given range bin for the kth IPP, with k ranging from 3:8 corresponding to the CPI Period in FIG. 2.

The new modified Doppler Filter for this invention after FIG. 3 may be expressed as:

$$DF_i = \left[ \sum_{k=3}^{8} w_{i,k} \cdot x_k \right] + w_{i,1} \cdot x'_1 \quad x'_1 = x_1 + x_9$$

where the prime denotes modified IQ data corresponding to the additional Fill Pulse IPP(s) recovered for the filter of this invention.

The new modified Doppler Filter for this invention after FIG. 4 may be similarly expressed as:

$$DF_i = \left[ \sum_{k=3}^{8} w_{i,k} \cdot x_k \right] + w_{i,1} \cdot x'_1 + w_{i,2} \cdot x'_2 \quad x'_2 = x_2 + x_{10}$$

More generally for arbitrary numbers of Fill Pulses and CPI Pulses this can be expressed as:

$$DF_i = \left[ \sum_{k=N_{fp}}^{N_{tot}} w_{i,k} \cdot x_k \right] + \left[ \sum_{j=1}^{N_{fp}} w_{i,j} \cdot x'_{j+N_{tot}} \right] \quad x'_{j+N_{tot}} = x_j + x_{j+N_{tot}}$$

where $N_{fp}$ is the number of Fill Pulses, and $N_{tot}$ is the total number of pulses transmitted.

The features and implications of the invention are now summarized. The invention seeks to recover the energy that is normally lost to Fill Pulses in PDW dwells and associated processing. The recovered energy is then used to increase SNR and SCR to what it would be if the Fill Pulses were regular CPI pulses. The method of the invention therefore does not require the addition of pulses to achieve higher SNR and SCR, but it does require passive collection of returning pulse energy from clutter within the Clutter Region after the last pulse is transmitted. This requires extending the dwell by a time equal to the total of number of IPPs times the number of what would have been Fill Pulses employed under the traditional processing paradigm. Therefore the invention does not require the transmission of more power, but it does require extending the whole dwell by appending a subsequent reception-only period equal in time to the number of Fill Pulses times the IPP. This is usually an excellent trade because no additional RF power need be transmitted to achieve an increase in SNR and SCR. It is noted that instead of using the invention to seek and achieve an increase in SNR and SCR by increasing the dwell time over the traditional PDW processing, alternatively, the invention may be used to permit retention of the same SNR and SCR while reducing the number of pulses in the dwell, and hence reducing the dwell time. This can be of importance when it is desired to reduce the occupancy of a radar without reducing its performance. It should also be noted that since the invention essentially eliminates Fill Pulses as a separate modality in PDW processing, it also eliminates their exploitation.

Because the effective number of Doppler filters are increased in the invention, there is also a correspondingly higher Doppler resolution. This enables both more accurate tracking as well as additional degrees of freedom to create steeper nulls in the Doppler filters for better operation near the clutter lobe.

There are two potential minor disadvantages to the invention which are generally of little consequence but may need to be accounted for. The first disadvantage is that the invention does require longer dwells as previously described. This is not really a disadvantage per se because one would have to add more pulses and thereby extend the dwell anyway with the conventional PDW paradigm and processing to achieve the higher SNR and SCR provided by the invention. The advantage of the invention is that the increased SNR and SCR can be obtained without radiating additional energy, which in most prior art systems the radar system is already operating at a maximum power output.

The second disadvantage applies only to rotating radars: stationary radars, or rotating radars that might back scan their beam while rotating on a pulse to pulse basis to compensate for motion, will not have this problem. For traditional rotating radars, the radar beam will be pointing at a slightly different position for the first Fill Pulse than it will be for the first extra IPP #1' 361 after the traditional CPI Period 240. By the time the radar is collecting IQ on IPP #1' 361, the antenna will have rotated to a slightly different azimuth, meaning that the clutter returns from the further out range intervals ARI#1 512 and ARI#2 513 (alternatively associated with pulse #7 and #8 from 251) will be from a different azimuth than other pulses. In a way, this may be inconsequential because in reality each and every IPP is taken at a different azimuth in a rotating radar anyway. However, whereas the IQ data from all the range intervals in the CPI Period are tightly correlated in time (having been taken only one or two IPPs apart), the IQ data from the near-in range intervals of the extended IPPs may be temporally and spatially more correlated than the farther out range intervals by comparison. This could result in worse clutter suppression capability in some cases due to rotation, particularly at the farther ranges. However, given that the nearest range interval changes least in cross range distance for a given azimuthal rotation than the far out range intervals, and that because of the invention more pulses are being processed to smooth out and average unexpected deviations, it is likely that such degradations are relatively small or inconsequential.

Note further that if the rotational motion of an antenna unduly compromises the clutter suppression capability of the radar either in the absence of the present invention or with the present invention, there are means for dealing with this. For example, by measuring the phase angle of the clutter return at each beam position during each pulse for each unambiguous range bin and potentially for each pulse in each folded interval, the clutter phase migration rate from pulse to pulse during a dwell of Doppler pulses may be determined. Knowing this (small) phase migration rate from the past averaging of clutter returns without a target in the same beam position and with the same dwell parameters, the phase of new IQ data, containing the same clutter in the same beam position and same range bins, and potentially now containing a target, may be compensated with a reverse phase shift, thereby undoing the effects of antenna rotation on clutter IQ vector rotation. One skilled in the art of radar signal processing may readily apply these teachings to the processing and antenna rotation compensation of pulses from any of the ambiguous range intervals. With the antenna rotation modulation thereby removed from the IQ data, the Doppler filtering operation, either with or without the present invention may proceed with a resultant improvement in the low Doppler frequency and slow target motion sensitivity of the radar.

Finally, and to generalize further, it should be noted that due to Fourier Time-Frequency complementarity, there is a complementary frequency domain technique of radar for every time (pulse) domain technique. In that such domains are paired, there exists a dual invention in the frequency domain to the current invention as has been presented in the time (pulsed) domain, and therefore the current invention also applies to frequency domain with suitable substitutions of dual Time-Frequency variables as may be straightforwardly derived by one skilled in the art of Fourier mathematics and radar signal processing.

Having thus described my invention and the manner of its use, it should be apparent to those skilled in the relevant arts that incidental changes may be made thereto that fairly fall within the scope of the following appended claims, wherein I claim:

1. A method for the coherent integration of Fill Pulses in Pulse Doppler Radar sensors, said method comprising:
transmitting a Pulse Doppler Waveform (PDW) comprising a plurality of precisely timed phase coherent pulses having equal inter pulse time intervals radiated into a narrow stationary or psuedo-stationary beam with a range extent within which moving targets to be detected and stationary or psuedo-stationary scatterers retro-reflect some PDW pulse energy back to a receiving sensor, the moving targets generating target signals in the receiving sensor and the stationary or psuedo-stationary scatterers generating clutter interference noise that reduces the sensitivity of the receiving sensor for detecting moving targets;
designating a number of first pulses in the PDW as Fill Pulses, said pulses being of identical pulse width and inter-pulse period (IPP) as all the other pulses in the PDW, wherein the number of Fill Pulses is the number needed to fully occupy a range extent of the receiving sensor, said range extent is a range from the receiving sensor within which both targets and clutter may reside, and the Fill Pulses is used to initialize a Doppler Filter Coherent Integrator;

conducting a first data collection period for receiving, sampling, and storing the energy of the Fill Pulses scattered by both targets and clutter from within the range extent as a function of time, starting immediately after a first Fill Pulse is emitted, and ending after a IPP following an emission of a last Fill Pulse, just before a first coherently integrated pulse is emitted;

conducting a second data collection period for receiving, sampling and storing the energy of coherently integrated pulses scattered by both targets and clutter from within the range extent as a function of time, starting immediately after emission of a first coherently integrated pulse and ending after a last IPP following an emission of a last coherently integrated pulse;

conducting a third data collection period for receiving, sampling and storing the energy of coherently integrated pulses scattered by both targets and clutter from within the range extent as a function of time, starting after the end of the last IPP of the last coherently integrated pulse emission, and ending immediately after the last emitted pulse has returned from a farthest distance of the range extent, coherently adding stored In-Phase and Quadrature (IQ) data as a function of time from the first data collection period during the emission of the Fill Pulses with stored IQ data as a function of time from the third data collection period after emission of the last PDW pulse, such that a first IPP of the first data collection period is temporally coincident with and is added to the first IPP of the third data collection period, the result containing IQ data as a function of time of a set of virtual pulses equal in number to the number of fill pulses, each IPP of which contains a complete range extent of collected data;

catenating the IQ data from the step above with the IQ data from the second data collection period during the emission of the coherently integrated pulses to create a new IQ data collection period with a number of pulses equal to a sum of the number of Fill Pulses and a number of coherently integrated pulses;

processing the resultant IQ data from the step above with a linear time-invariant filter designed to process a PDW with a number of pulses equivalent to the sum of the number of Fill Pulses and the number of coherently integrated pulses; and extracting and thresholding Doppler signature from the Doppler filters from the step above, the signal to noise ratio (SNR) and/or signal to clutter ratio (SCR) of which is increased by a factor of approximately the ratio of the total number of pulses transmitted divided by the number of integrated pulses.

2. The method for the coherent integration of Fill Pulses in Pulse Doppler Radar type sensors as in claim 1, wherein the IPP between pulses varies from pulse to pulse, such variance being used to resolve range and velocity ambiguities and to spoof electronic detection sensors attempting to detect and identify the emitting sensor.

3. The method of claim 1, further comprising a means to compensate for the phase migration induced on the clutter In-Phase and Quadrature signal by the beam sweeping across the clutter during the dwell, said means further comprising a means for measuring, averaging and storing the clutter phase migration during the dwell, nominally but not necessarily without target, from each beam position and range bin, and then using that migration to compute and apply a phase migration compensation that mitigates and reduces the phase migration from pulse to pulse, thereby reducing the clutter residue that emerges from Doppler processing.

4. The method of claim 1, converted to and applied to the frequency domain and applied to Frequency domain radars for the coherent integration of frequencies without need for the frequency counter part of fill pulses.

5. A method for coherent integration of fill pulses in a sensor for coherent detection of at least one moving target comprising:

transmitting a plurality of phase coherent pulses, each pulse transmitted with a precisely timed emission wherein said moving target generates a target return and clutter scatters generate a clutter return, designating a first plurality of said phase coherent pulses as fill pulses, with a number of said fill pulses selected to fill a range extent of said sensor, receiving, sampling and storing fill returns from said fill pulses as a function of time, designating a second plurality of said phase coherent pulses as coherently integrated pulses, receiving, sampling and storing first returns from said coherently integrated pulses and terminating at an end of the last IPP following the emission of a last coherently integrated pulse, receiving, sampling and storing second returns from said coherently integrated pulses starting after the end of a last IPP of the last coherently integrated pulse, and ending immediately after a last second return has returned from the farthest distance of the range extent, coherently adding stored In-Phase and Quadrature (IQ) data from said fill returns with stored IQ data from said second returns, the result of the coherent addition containing IQ data as a function of time and creating a set of virtual pulses equal in number to a number of fill pulses, each IPP of which contains a complete range extent of collected data, catenating said result of the coherent addition with IQ data of said first returns, creating a new IQ data collection period with a number of pulses equal to the sum of the number of Fill Pulses and the number of coherently integrated pulses, processing the resultant IQ data from said catenating with a linear time-invariant filter designed to process a Pulse Doppler Waveform (PDW) with a number of pulses equivalent to the sum of the number of Fill Pulses and the number of coherently integrated pulses, whereby a Doppler signal is extracted having a signal to noise ratio (SNR) increased by a ratio approximately defined by a total number of pulses transmitted divided by a number of coherently integrated pulses transmitted.

6. The method of claim 5, further comprising varying the IPP between pulses from pulse to pulse, such variance being used to resolve range and velocity ambiguities and to spoof electronic detection sensors attempting to detect and identify the emitting sensor.

7. A method for coherent integration of fill pulses in a sensor for coherent detection of at least one moving target comprising:

transmitting a plurality of phase coherent pulses, each pulse transmitted with a precisely timed emission wherein said moving target generates a target return and clutter scatters generate a clutter return, designating a first plurality of said phase coherent pulses as fill pulses, with a number of said fill pulses selected to fill a range extent of said sensor, receiving, sampling and storing fill returns from said fill pulses as a function of time, designating a second plurality of said phase coherent pulses as coherently integrated pulses, receiving, sampling and storing first returns from said coherently integrated pulses and terminating at an end of a last IPP following the emission of a last coherently integrated pulse, receiving, sampling and storing second returns from said coherently integrated pulses starting after the end of a last IPP of the last coherently integrated pulse, and ending immediately after a last second return has returned from the farthest distance of the range extent, coherently adding stored In-Phase and Quadrature (IQ) data from said fill returns with stored IQ-data from said second returns, the result of the coherent addition containing I & Q data as a function of time and creating a set of virtual pulses equal in number to a number of fill pulses, each IPP of which contains a complete range extent of collected data, catenating said result of the coherent addition with IQ data of said first returns, creating a new IQ data collection period with a number of pulses equal to the sum of the number of Fill Pulses and the number of coherently integrated pulses, processing the resultant IQ data from said catenating with a linear time-invariant filter designed to process a Pulse Doppler Waveform (PDW) with a number of pulses equivalent to the sum of the number of Fill Pulses and the number of coherently integrated pulses, whereby a total number of transmitted pulses is reduced.

8. A method for coherent integration of fill pulses in a sensor for coherent detection of at least one moving target in the presence of clutter interference comprising:

transmitting a plurality of phase coherent pulses, each pulse transmitted with at least a precisely timed emission wherein said moving target generates a target return and clutter scatters generate a clutter return, designating a first plurality of said phase coherent pulses as fill pulses, with a number of said fill pulses selected to fill a range extent of said sensor, receiving, sampling and storing fill returns from said fill pulses, starting immediately after a first fill pulse is emitted, and terminating at the end of the last interpulse period (IPP) following the emission of the last fill pulse, designating a second plurality of said phase coherent pulses as coherently integrated pulses, receiving, sampling and storing first returns from said coherently integrated pulses starting immediately after emission of the first coherently integrated pulse and terminating at an end of the last IPP following the emission of the last coherently integrated pulse, receiving, sampling and storing second returns from said coherently integrated pulses starting after the end of the last IPP of the last coherently integrated pulse, and ending immediately after the last second return has returned from the farthest distance of the range extent, coherently adding the stored In-Phase and Quadrature (IQ) data from said fill returns with stored IQ data from said second returns, the result of the coherent addition containing IQ data as a function of time and creating a set of virtual pulses equal in number to the number of fill pulses, each IPP of which contains a complete range extent of collected data, catenating said result of the coherent addition with IQ data of said first returns, creating a new IQ data collection period having a number of pulses equal to a sum of the number of Fill Pulses and a number of coherently integrated pulses, processing the resultant IQ data from said catenating with a linear time-invariant filter designed to process a Pulse Doppler Waveform with a number of pulses equivalent to the sum of the number of Fill Pulses and the number of coherently integrated pulses, whereby said clutter return is reduced or eliminated, increasing a signal to noise ratio (SNR) ratio.

9. A method for coherent integration of fill pulses in a sensor comprising:

transmitting a plurality of pulses, designating, as fill pulses, a sufficient number of said plurality of pulses to fill a range extent of said sensor, receiving fill returns from said fill pulses, designating others of said plurality of pulses as coherently integrated pulses, receiving a first set of returns from said coherently integrated pulses, receiving a second set of returns from said coherently integrated pulses, adding data from said fill returns with data from said second set of returns to form a set of virtual pulses, combining said virtual pulses with data from said first set of returns, processing a result of said combining to extract a signal having at least a signal to noise ratio (SNR) increased by about a ratio of total number of pulses transmitted divided by said coherently integrated pulses transmitted.

* * * * *